L. MOORE.
Hand-Seeder.
No. { 93, 1,198 }
Reissued June 18, 1861
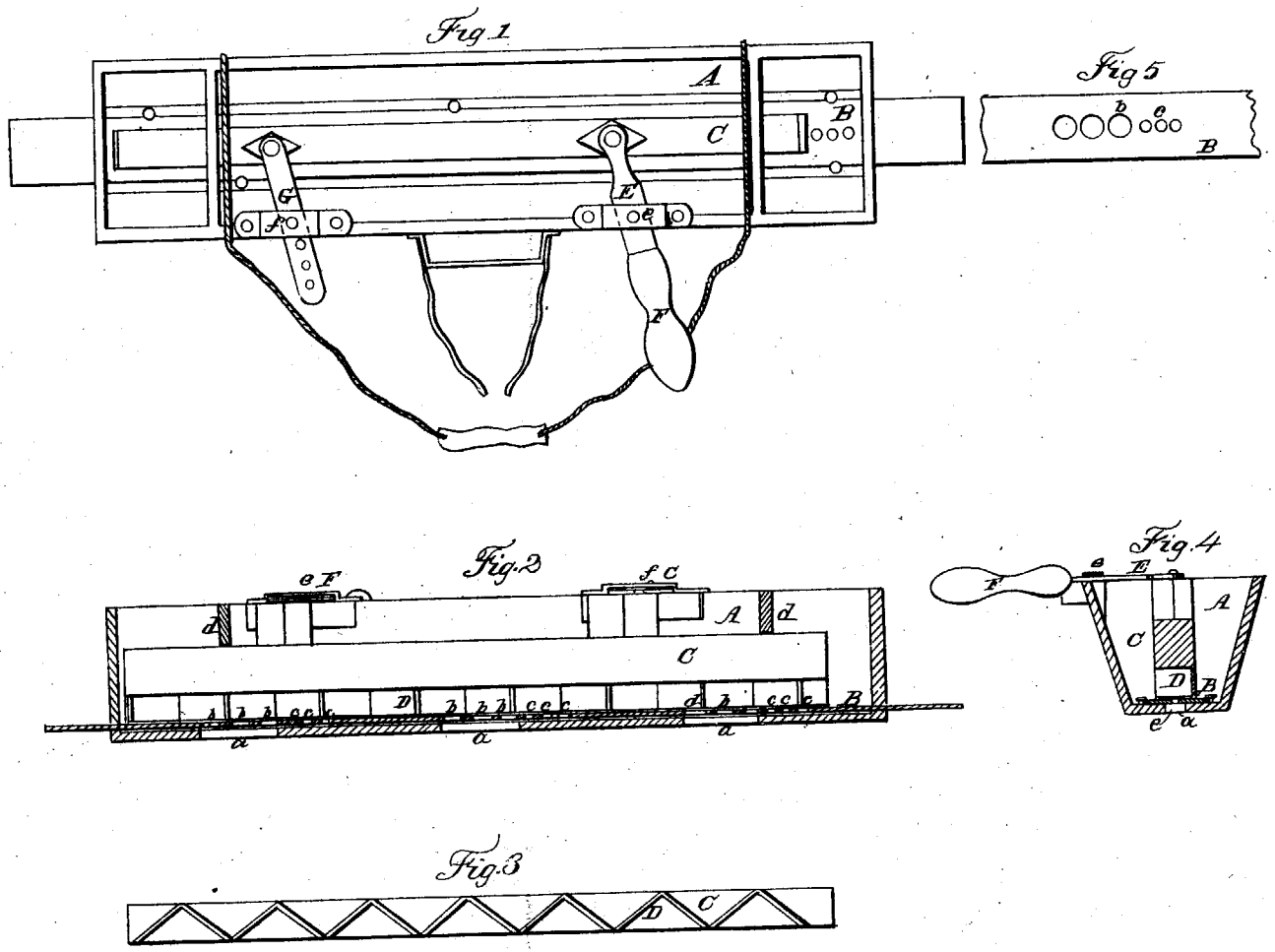
N. PETERS, PHOTO-LITHOGRAPHER, WASHINGTON, D. C.

UNITED STATES PATENT OFFICE.

LEWIS MOORE, OF YPSILANTI, MICHIGAN.

IMPROVEMENT IN SEEDING-MACHINES.

Specification forming part of Letters Patent No. 21,354, dated August 31, 1858; Reissue No. 1,198, dated June 18, 1861.

*To all whom it may concern:*

Be it known that I, LEWIS MOORE, of Ypsilanti, in the county of Washtenaw and State of Michigan, have invented a new and Improved Seed-Drill for Planting Flax, Grass, and other Seeds; and I do hereby declare that the following is a full, clear, and exact description of the same, reference being had to the accompanying drawings, forming a part of this specification, in which—

Figure 1 is a plan or top view of my improvement. Fig. 2 is a longitudinal vertical section of the same. Fig. 3 is an inverted plan of the reciprocating zigzag plate. Fig. 4 is a transverse vertical section of my improvement, and Fig. 5 is a detached view of a portion of the perforated slide.

Similar letters of reference in each of the several figures indicate corresponding parts.

The nature of my invention consists, first, in the combination of the thin zigzag strip, projecting from the bottom of a reciprocating bar, with an adjustable gage-plate which has different-sized seed-cells, and a hopper having large slots or discharge-passages in its bottom.

It consists, second, in the combination of a gage-plate which has its ends extending beyond the ends of the hopper, and has two different-sized sets of seed-passages, with the stationary perforated bottom of the hopper and a vibrating seed-agitating bar, substantially in the manner and for the purposes herein described.

It consists, third, in the zigzag seed-agitator in combination with a seed-hopper.

By using the zigzag plate a very thorough and perfect agitation and sweeping of the seed into the cells of the gage-plate is accomplished along the entire bottom of the hopper, and by having the gage-plate furnished with two or more sets of seed cells or holes which are arranged in the same line but one longitudinal adjustment is necessary, and different kinds of grain can be planted and more or less sown to the acre, and this adjustment can be made very conveniently from the outside of the hopper, as the ends of the gage-plate extend out far enough to allow the operator to take hold of them.

To enable others skilled in the art to make and use my invention, I will proceed to describe its construction and operation.

A represents the hopper, which is of the usual form, or such as is used in many seed-drills. The bottom of the hopper has large holes *a* cut through it at suitable distances apart. Three holes are shown in Fig. 2; but more may be used, if necessary.

On the bottom of the hopper A there is placed a plate, B, the ends of which pass through openings *m m*, formed between the bottom and end pieces of the hopper. This plate is perforated with small holes *b c*. (See Fig. 5.) These holes are formed in sets which vary in size, so as to accommodate different-sized seeds. The respective seed cells or holes are brought over the slots *a* in the bottom of the hopper by moving the plate B, which is adjustable or slides longitudinally on the bottom of the hopper. The passages *m m*, between the bottom and the ends of the hopper, allow a free movement longitudinally of said plate, and the extending ends *s s* of the plate afford convenience for taking hold of the plate from the outside of the hopper.

Within the hopper A, and near each end, there is placed a transverse partition, *d*, having recesses cut through it, in which recesses a bar, C, is fitted and works, the recesses serving as guides for the bar.

To the under surface of the bar C there is attached a zigzag plate or strip, D, the form of which is plainly shown in Fig. 3. The lower edge of this plate D rests upon the plate B, as shown in Fig. 2.

To the upper surface of the bar C there is attached the inner end of a lever, E, having its fulcrum at *e*. The outer end of the lever E is provided with a handle, F. There is also another lever, G, attached to the upper surface of the bar C, the lever G having its fulcrum at *f*. The hopper A is supplied or filled with the seed to be sown, and the plate B is adjusted or moved so as to bring the proper-sized holes over the slots *a*. The hopper A may be attached to a frame and the reciprocating bar C operated by gearing; or it may be suspended from the shoulders of the operator, so as to be directly in front of him, and be worked by the operator as he walks over the field, he grasping and moving back and forth the handle F of the lever E, and thereby causing the bar C, with the zigzag plate D, to have a reciprocating motion imparted to it. The zigzag plate D, in its movements, draws or forces the seed to a position directly over the holes in the plate B, through which holes the seed falls upon the prepared ground.

It will be seen that by having different-sized holes in the plate B different-sized seed may be sown. The reciprocating bar and plate C D insure the equal or regular distribution of the seed.

The implement is extremely simple, economical to manufacture, and not liable to get out of repair.

What I claim as my invention, and desire to secure by Letters Patent, is—

1. The zigzag-shaped strip D, in combination with a seed-hopper, substantially as and for the purpose set forth.

2. The combination of the thin zigzag-shaped strip D, reciprocating bar C, and adjustable perforated gage-plate B *b b′ c c*, and hopper A *a*, substantially as and for the purposes described.

3. The combination of the gage-plate B, which has its ends *s* extending beyond the ends of the hopper, and has two different-sized sets of seed-cells, *b c*, with the stationary perforated bottom of the hopper A *a*, and a vibrating seed-agitating bar, substantially as and for the purposes set forth.

The above specification of my improvement in seeding-machines signed by me this 20th day of April, 1861.

LEWIS MOORE.

Witnesses:
E. J. MILLS,
D. B. GREENE.